Jan. 16, 1968

D. H. DIERKSHEIDE 3,363,741

ARTICLE CONVEYING APPARATUS

Filed Sept. 21, 1966

INVENTOR.
DALE H. DIERKSHEIDE
BY
J. R. Nelson
and W. A. Schuch
ATTORNEYS

United States Patent Office 3,363,741
Patented Jan. 16, 1968

3,363,741
ARTICLE CONVEYING APPARATUS
Dale H. Dierksheide, Streator, Ill., assignor to
Owens-Illinois, Inc., a corporation of Ohio
Filed Sept. 21, 1966, Ser. No. 580,984
3 Claims. (Cl. 198—25)

ABSTRACT OF THE DISCLOSURE

Driven, peripherally pocketed, star wheel for transferring articles by pushing them from one horizontal conveyor to another, together with an endless flexible belt or guide set on edge and positioned to close certain of the pockets to confine articles in such pockets during transfer, the belt or guide being advanced with the pockets by reason of its frictional contact with peripheral portions of the star wheel which rotates on a vertical axis.

My invention relates to article conveying apparatus and more particularly is concerned with the provision of novel, simple effective means for transferring articles from one conveyor to another with a minimum of sliding contact between the articles and elements of the transfer means, thereby to minimize surface scuffing, etc.

In transferring articles of glassware from one horizontal conveyor to another, it is common practice to employ a star wheel which is placed near the juncture of the two conveyors, such star wheel rotating on a vertical axis and functioning to sweep bottles, for example, over a dead plate interposed between the conveyors. To insure retention of the bottles in the pockets of the star wheel for transfer purposes, a fixed arcuate guide overlies the first conveyor and dead plate in proximity to the periphery of the star wheel. Thus, the articles being transferred are positively confined within the star wheel pockets during the transfer operation. This sort of apparatus, though satisfactory for handling many types of articles is seriously deficient where bottles, jars and the like glass articles are involved and more especially where such articles have just been fabricated and perhaps are still warm or hot and readily subject to surface abrasions. Such articles while being advanced by the star wheel may rub against the fixed guide wall and be badly scuffed thereby. Should two newly made bottles become stuck together and enter a star wheel pocket, they very likely would be crowded against the fixed metal guide wall and shattered. Such conditions of course are intolerable.

An important object of my invention therefore, is to eliminate the cause of the above noted objectionable condition and to that end I substitute for the rigid metal guide wall, a flexible wall which travels a short distance with the star wheel rotation and may yield under pressure of articles in the star wheel pockets, should circumstances require same.

A further object of my invention is the provision in apparatus of the above character, if an endless belt positioned "on edge" and extending in part about a portion of the star wheel and moving at the same speed as the star wheel so that there will be no appreciable or objectionable relative movement between articles and the belt-type guide wall during the transfer operation.

It is likewise an object of my invention to provide an apparatus of the above character, a belt-type guide wall formed of asbestos or some such heat-resistant material and position the belt so that it not only closes the open end of adjacent star wheel pockets, but receives its power from and is thereby advanced at the same speed as the star wheel by reason of its being in frictional engagement with the star wheel periphery.

Other objects will be in part apparent and in part pointed out hereinafter.

In the accompanying drawings forming a part of my application:

Figure 1:
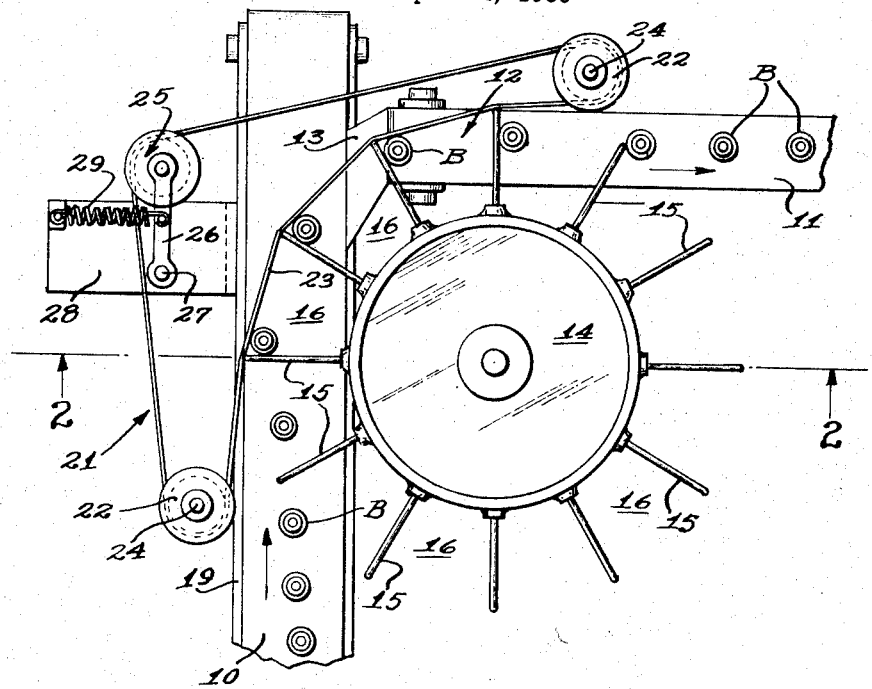
FIG. 1 is a fragmentary top plan view showing my invention incorporated in a conventional conveyor and star wheel arrangement.
Figure 2:
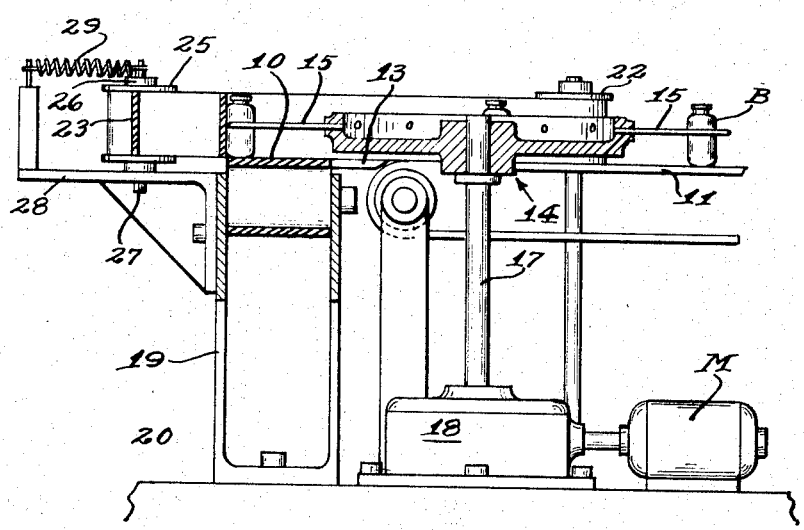
FIG. 2 is a sectional elevational view taken along the plane of line 2—2 of FIG. 1.

For the purposes of illustration, I have shown my invention in conjunction with a pair of driven horizontal conveyors, there being a first conveyor 10 and a second conveyor 11, the latter having its receiving end 12 positioned relatively close to one side of the first conveyor 10, there being a dead plate 13 over which articles slide during transfer to the second conveyor. These conveyors may be driven by any conventional or preferred means (not shown). A star wheel 14 is positioned adjacent the two conveyors so that the radial paddles 15 or fingers which create the pockets 16 move in succession over the first conveyor 10 and then over the receiving end 12 of the second conveyor 11. This star wheel is mounted at the upper end of a vertical shaft 17 which rises from a speed reduction gear unit 18. A motor M is operatively connected to the gear unit 18. This unit 18 as well as the motor M and a frame 19 for the conveyors may be mounted upon a base 20.

In lieu of the conventional fixed rigid guide wall, I utilize an on-edge endless belt 21 which preferably is formed of asbestos or some equivalent heat-resistant material. This belt is trained over several flanged pulleys. One pulley 22 is placed beside each conveyor 10 and 11 in such relationship that the working reach 23 of the conveyor engages the free end of several adjacent star wheel arms 15 while moving over adjacent portions of the two conveyors, thereby to close the normally open outer ends of the pockets 16 for a short distance of travel and thus insure retention of bottles B therein for transfer purposes. These two pulleys rotate freely on vertical shafts 24, which may be supported on brackets (not shown). The working reach 23, because of its firm engagement with the star wheel arms 15, advances with the latter so that in effect it functions as a flexible wall closing several of the pockets 16, for the purpose stated. A tensioning pulley 25 is mounted on a swingable horizontal arm 26 which in turn is secured by a vertical pivot pin 27 to a bracket 28. A tension coil spring 29 yieldingly urges the pulley 25 against the belt 21, thus holding it firmly against the star wheel arms 15.

In view of the foregoing it is believed clear that the belt 21 provides a moving, rather than a fixed guide, which cannot scuff or otherwise mar the surface of hot bottles being transferred. It is also evident that should two or more "stuck" bottles find their way into a single pocket 16, the belt, if necessary, will yield to accommodate the bottles and later will return to its normal operating position. On the other hand, a fixed rigid wall would in all probability shatter the bottles, to say the least.

Modifications may be resorted to within the spirit and scope of the appended claims.

I claim:

1. In combination, a driven peripherally pocketed star wheel mounted for rotation on a vertical axis to transfer articles from one horizontal conveyor to the receiving end of another conveyor, the star wheel sockets being movable over adjacent portions of both conveyors, a flexible vertical guide wall overlying portions of said conveyors and positioned to close otherwise open outer ends of the pockets during at least a part of their travel over the conveyors, the guide wall being an endless belt having a working reach engaging the periphery of a sector of the star wheel, said belt being moved lengthwise solely by reason of its engagement with the driven star wheel.

2. In a combination as defined in claim 1, the guide wall being a driven endless belt positioned on edge and with a working reach having a surface frictionally engaging the periphery of a section of the star wheel whereby to effect advance of said belt with the star wheel periphery.

3. In a combination as defined in claim 1, there being a pulley substantially at each end of the working reach over which the belt is trained and a belt-tensioning pulley for yieldingly holding the working reach in engagement with the star wheel.

References Cited
UNITED STATES PATENTS

| | | | |
|---|---|---|---|
| 2,016,268 | 10/1955 | Griffith | 198—160 |
| 3,164,240 | 1/1965 | Banks | 198—25 |
| 3,227,260 | 1/1966 | Graves | 198—25 |
| 2,713,960 | 7/1955 | Siegal | 198—167 |
| 3,289,814 | 12/1966 | Rosema | 198—134 |

FOREIGN PATENTS

| | | |
|---|---|---|
| 1,171,558 | 10/1958 | France. |
| 834,791 | 8/1956 | Great Britain. |

RICHARD E. AEGERTER, *Primary Examiner.*

EVON C. BLUNK, *Examiner.*

UNITED STATES PATENT OFFICE
CERTIFICATE OF CORRECTION

Patent No. 3,363,741                      January 16, 1968

Dale H. Dierksheide

It is hereby certified that error appears in the above numbered patent requiring correction and that the said Letters Patent should read as corrected below.

Column 2, line 66, for "sockets" read -- pockets --.

Signed and sealed this 15th day of April 1969.

(SEAL)
Attest:

Edward M. Fletcher, Jr.                   EDWARD J. BRENNER
Attesting Officer                         Commissioner of Patents